Nov. 11, 1952          L. S. MEYER          2,617,356

PRINTING ROLLER TESTING DEVICE

Filed March 1, 1950

INVENTOR.
Leonard S. Meyer.
BY
Corbett, Mahoney & Miller
ATTORNEYS

Patented Nov. 11, 1952

2,617,356

UNITED STATES PATENT OFFICE 2,617,356

PRINTING ROLLER TESTING DEVICE

Leonard S. Meyer, Newark, Ohio

Application March 1, 1950, Serial No. 146,968

2 Claims. (Cl. 101—153)

My invention relates to a printing roller testing device. It has to do, more particularly, with a manually operated device which can be used for testing the color and condition of ink to be applied to a printing roller as well as to testing the condition of the surface of the roller.

In enlarged printing presses, such as rotogravure presses, it is quite desirable before a printing operation to test the color, consistency, et cetera, of ink to be used in the printing process and to sometimes test the condition of the surface of the printing or impression cylinder which is usually an engraved metal cylinder. Since these presses are very large and the impression cylinders are very large, it is desirable to have some device which can be quickly and manually passed over a portion of the surface of the cylinders to which a small amount of ink has been applied, in order to test the ink and the cylinder surface. This eliminates the need for rotating the large roller to cause the ink fount to apply ink to the cylinder.

It is the object of my invention to provide an extremely simple device which can be used for testing large impression cylinders and the ink to be applied thereto.

It is an additional object of my invention to provide a device of the type indicated which is very simple to use and to move in testing relationship with a printing or impression cylinder.

Various other objects will be apparent.

According to my invention, I provide a frame which carries rollers upon which can be mounted a testing strip of paper or other suitable flexible material. The frame also carries a doctor blade which will be positioned ahead of the rollers and which is adapted to contact the surface of the impression cylinder. A small amount of ink is applied to the surface of the impression cylinder and my device is then moved so that the doctor blade engages the ink and spreads it over the surface of the cylinder. One of the rollers carried by the frame, directly follows the doctor blade and movement of this roller over the surface of the impression cylinder causes the strip of paper to feed therebetween and to become imprinted with the ink and the surface of the impression cylinder. Then by observing the printed surface of the paper, it can be determined whether the ink is of proper color and consistency and the surface of the impression cylinder is in proper condition.

The preferred embodiment of my invention is illustrated in the accompanying drawing wherein similar characters of reference designate corresponding parts and wherein.

Figure 1:
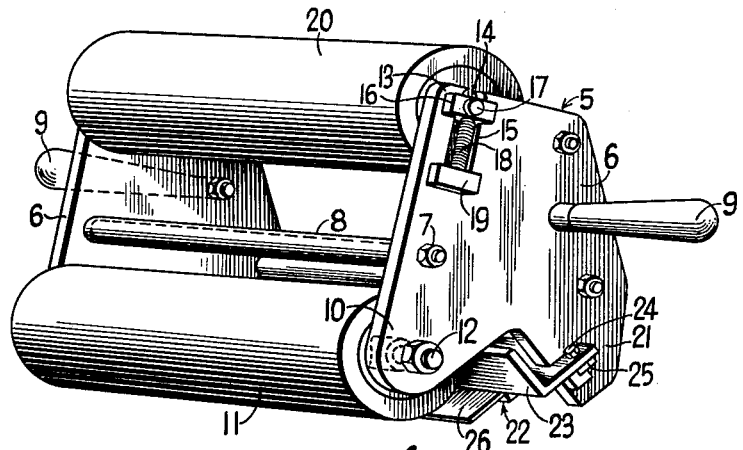
Figure 1 is a perspective view of a device made according to my invention.

With reference to the drawing, I have illustrated my testing device as comprising a frame 5 which is composed of the side plates 6 which are joined together by laterally extending bolt and nut units 7, the plates being held in laterally spaced relationship by spacer sleeves 8. The frame carries the oppositely extending handgrips 9, each of which is carried on the outer surface of a plate 6 and extends outwardly normal thereto.

Each of the plates 6 has a rearwardly and downwardly extending roller-supporting portion 10 which carries a driving roller 11, the roller being mounted between these portions 10 and being carried by a transverse shaft 12. Roller 11 is preferably made or covered with resilient material such as rubber. At the upper and rear corner 13 of each plate, a shaft-receiving notch 14 is provided and communicates with a vertical slot 15. This slot 15 carries a vertical guide member 16 which supports the transverse shaft 17. A spring 18 bears against the member 16 and against a fixed abutment 19 at the lower end of the guide slots 15 and normally keeps the member 16 in the upper end of the slot 15, outward movement out of the guide slots being prevented by the narrower notch 14. The shaft 17 extends transversely parallel to shaft 12 and carries an idler tensioning roller 20.

Each of the plates 6 is provided with a forwardly and downwardly extending supporting portion 21 which is adapted to carry a doctor blade unit 22. This unit 22 embodies a support which extends transversely between the two plates 6 and is in the form of an angle member 23. This angle member is notched at each end to fit over the rear edge of the portion 21 of the plate 6. At each end it is removably secured to the portion 21 of the plate by means of a screw bolt 24 extending through a lug 25 formed on the outer surface of portion 21 of the plate. The doctor blade is in the form of a flexible strip blade 26 which has its forward edge clamped to the angle member 23 by means of a clamping metal bar 27 secured to the angle member by means of longitudinally spaced bolts 28. The blade 26 extends rearwardly and downwardly in close proximity to the roller 11.

Figure 2:
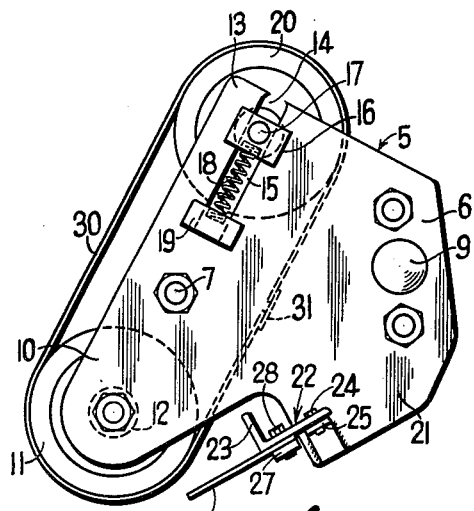
Figure 2 is an end elevational view of the device.
Figure 3:
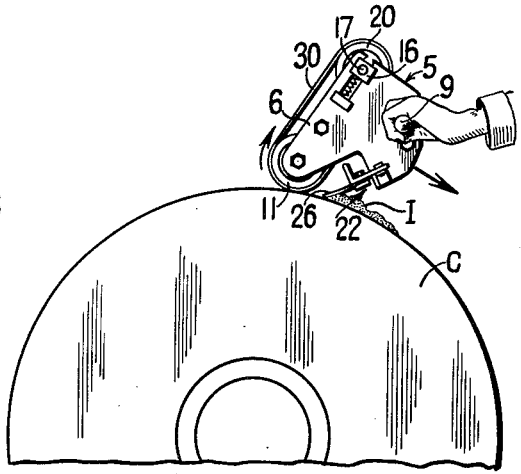
Figure 3 is a side elevational view of the device showing it in use in testing position on an impression cylinder.
Figure 4:
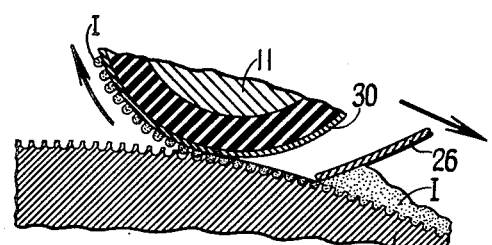
Figure 4 is an enlarged diagrammatic view, mainly in vertical section, illustrating the action of the testing device.

In using my device for testing in connection with a large cylinder C, as shown in Figures 3 and 4, a strip of paper 30 or of other suitable material is mounted on the device. This strip is passed around the outer surfaces of both of the rollers 11 and 20 and its ends are taped together, as indicated at 31 in Figure 2, so that it will be in endless form and will be carried by the two rollers so that it will feed therearound. In positioning the strip on the rollers, the roller 20 may be pushed slightly towards the roller 11 so that the springs 18 will tend to return it to its original position and keep it taut.

In testing the cylinder, which is usually an engraved metal cylinder, a small amount of printing ink I is placed on the surface of the cylinder in front of the testing device. If the device is now gripped with both hands, as indicated in Figure 3, and is pulled towards the person making the test, the doctor blade 26 will first contact the ink and spread it over the surface of the cylinder as shown in Figure 4, filling the capillaries or small cavities therein. The feed roller 11 with the paper strip 30 thereon will closely follow the doctor blade 26 and the ink in the capillaries will be attracted to the surface of the paper. The feed roller 11, being rolled by contact with the surface of the cylinder will feed the endless strip of paper 30 in the direction indicated by the arrows in Figures 3 and 4. Thus, an impression will be made on the surface of the paper and by examining this surface, it can be determined whether the ink is proper and whether the surface of the cylinder is in proper condition.

It will be apparent from the above description that I have provided a simple and inexpensive device for testing impression cylinders and ink to be used thereon as indicated above. The paper strip can be easily and quickly mounted on the device and be removed therefrom. The doctor blade will uniformly spread the ink so that it will be applied properly to the paper strip so as to simulate actual printing conditions.

Various other advantages will be apparent.

Having thus described my invention, what I claim is:

1. A portable printing roller testing device adapted to be positioned in association with an impression cylinder to be tested and to be moved away therefrom when testing is completed, comprising a frame composed of laterally spaced plates joined together by transverse members, a pair of vertically spaced rollers rotatably carried by said plates adjacent the rear edges of said plates and adapted to have an endless strip of paper passed therearound, the lowermost roller being a feed roller adapted to contact the surface of the impression cylinder when the device is associated therewith and to be driven only by contact therewith, a doctor blade carried by said plates adjacent the lower edges thereof and forwardly of said feed roller so as to extend transversely directly in front of said feed roller for spreading ink applied to said impression cylinder, and oppositely extending handles carried by said plates and extending outwardly therefrom at a location intermediate the height of said rollers and forwardly and upwardly of said doctor blade so that the device can be pulled forwardly around said impression cylinder with the portion of the strip of paper which passes around the feed roller and the doctor blade in contact with said cylinder.

2. A testing device according to claim 1 wherein means is provided for mounting the upper roller on said side plates for movement towards said lower roller, and resilient means tending to move said upper roller away from said lower roller.

LEONARD S. MEYER.

REFERENCES CITED

The following references are of record in the file of this patent:

UNITED STATES PATENTS

| Number | Name | Date |
|---|---|---|
| 794,487 | Brod | July 11, 1905 |
| 950,277 | Current et al. | Feb. 22, 1910 |
| 1,350,918 | Bjorn | Aug. 24, 1920 |
| 1,934,751 | Von Webern | Nov. 14, 1933 |
| 2,158,237 | Huck | May 16, 1939 |
| 2,237,357 | Milner | Apr. 8, 1941 |
| 2,308,107 | Robbins et al. | Jan. 12, 1943 |
| 2,539,965 | Moss et al. | Jan. 30, 1951 |